Dec. 15, 1970     J. R. McWHIRTER     3,547,811
CYCLIC OXYGENATION OF BOD-CONTAINING WATER
Filed July 2, 1969     4 Sheets-Sheet 1

INVENTOR
JOHN R. McWHIRTER
BY
*John C. ...*
ATTORNEY

United States Patent Office 3,547,811
Patented Dec. 15, 1970

3,547,811
CYCLIC OXYGENATION OF BOD-CONTAINING WATER
John R. McWhirter, Williamsville, N.Y., assignor to Union Carbide Corporation, New York, N.Y., a corporation of New York
Filed July 2, 1969, Ser. No. 838,442
Int. Cl. C02c *1/10, 1/12*
U.S. Cl. 210—7                    14 Claims

ABSTRACT OF THE DISCLOSURE

BOD-containing water such as sewage is mixed with active biomass and a first quantity of oxygen feed gas in a first cycle for biochemical oxidation to produce oxygenated liquid-solid and unconsumed oxygen-containing gas of lower purity than the feed gas. The unconsumed oxygen is discharged and a second quantity of oxygen feed gas is introduced for mixing in a second biochemical oxygenation cycle.

CROSS-REFERENCES TO RELATED APPLICATIONS

The following applications relating to oxygenation of BOD-containing water were filed simultaneously with this application:

Ser. No. 838,467, High Oxygen Utilization in BOD-Containing Water Treatment, J. R. McWhirter; Ser. No. 838,498, Biochemical Oxidation with Low Sludge Recycle, E. K. Robinson and J. R. McWhirter; Ser. No. 838,499, Bio-Oxidation with Low Sludge Yield, J. R. McWhirter; Ser. No. 838,500, Staged Oxygenation of BOD-Containing Water, J. R. McWhirter.

BACKGROUND OF THE INVENTION

This invention relates to a method of and apparatus for treating BOD-containing water by oxygenation. The BOD-containing water may for example be municipal sewage, chemical waste from petrochemical or paper plants, or fermentation liquor.

With few exceptions, biochemical oxidation methods have employed air as the oxygen source. The large quantity of air required to supply the necessary oxygen is largely due to the 4/1 dilution with nitrogen, and typically only 5–10% of the potential oxygen mass transfer efficiency of the method is attained. However, the air is "free" and the large amount of energy supplied to the air is normally sufficient to mix and suspend the bacterial solids (active biomass) in the liquid.

The direct use of oxygen instead of air in treatment of municipal and chemical wastes has been considered for many years because of its potential advantages in reducing the quantity of gas required. Moreover, it has been speculated that the rate and completeness of such biochemical reactions are suppressed by low dissolved oxygen (DO) levels in the liquor. Because of the additional cost of oxygen, it must be used sparingly and effectively. This necessitates a small volumetric ratio of gas-to-liquor as compared to air aeration. Also, the partial pressure of oxygen in the aerating gas must be sustained at high level to achieve economies in the cost and operation of aeration equipment while still obtaining high overall levels of oxygen utilization. The prior art has not discovered a method which maintains high oxygen partial pressure in aeration while simultaneously utilizing a high percentage of the oxygen contained in the valuable gas. Conventional air aeration techniques do not satisfy these requirements.

Other conventional gas-liquid contacting techniques such as packed or plate-type columns, sparged columns, or agitated gas-liquid columns which are commonly employed in chemical processing are not well suited for this particular purpose. Although these systems can be designed to achieve a high percentage oxygen absorption, they are not readily adapted to the handling of mixed liquid-solid suspensions such as encountered in activated sludge processes for waste water treatment. Neither are the conventional systems suited for contacting large volumes of liquor and small volumes of gas with high rates of dissolution and with low energy consumption.

The achievement of both high oxygen utilization and high oxygen partial pressure in biochemical oxidation processes is further complicated by the evolution of diluent gases from the mixed liquor undergoing aeration Usually the BOD-containing feed water to the process is nitrogen-saturated with respect to air. While mass transfer of nitrogen is not a consideration when air aeration is employed, it becomes a very significant factor when the nitrogen content of the aeration gas is reduced and the volume of aeration gas becomes small. This is because the dissolved nitrogen will be stripped from the liquor into the gas and will reduce the oxygen partial pressure of the gas. Other gases evolved from the liquor which are inert to the biochemical reaction will have a similar effect, e.g., argon and moisture. Carbon dioxide, which is a product of the oxidation, will also evolve in substantial quantity and further suppress the oxygen partial pressure.

If an oxygen-enriched aeration gas is utilized effectively, then its volume relative to air will be very low, e.g., 1/90. While this offers opportunities for cost savings in gas compression, it aggravates the problems of liquid mixing and of oxygen dilution with impurities. The total energy input to the small quantity of gas for purposes of oxygen solution may now be far less than that required for suspending and mixing the solids in the liquid. The inert gases evolved from the liquor will also impair the oxygen partial pressure to a greater extent as the quantity of aeration gas is reduced.

It is an object of this invention to provide an improved system for treating BOD-containing water with oxygen gas for biochemical oxidation.

Another object is to provide a system characterized by high rate of oxygen transfer to the BOD-containing water per unit of energy input, which represents a substantially higher energy transfer efficiency as compared to conventional atmospheric air aeration techniques.

Still another object is to provide a system for oxygenation of BOD-containing water characterized by high oxygen partial pressure and high oxygen utilization efficiency.

Other objects and advantages of this invention will be apparent from the ensuing disclosure and appended claims.

SUMMARY

This invention relates to a method of and apparatus for the treatment of BOD-containing water by cyclic biochemical oxygenation in contact with biomass.

The prior art has been unable to quantitatively elucidate the complex multi-component gas-liquor mass transfer process and related liquor phase reaction characteristic of oxygen aeration of BOD-containing water. This is undoubtedly one reason why oxygen has not been commercially utilized for biochemical oxidation of sewage. This combined gas-liquor mass transfer process and liquor phase reaction have now been positively identified. The method and apparatus of the invention effectively utilizes the relative component equilibrium solubilities and stoichiometry to afford a highly efficient system characterized by high percentage oxygen absorption while simultaneously maintaining a high oxygen partial pressure in the aerating gas system.

In one method aspect, as a first oxygenation cycle BOD-containing water and biomass, i.e. liquor, are mixed with a first feed gas quantity comprising at least 50% oxygen (by volume) and having oxygen partial pressure of at least 7.3 p.s.i.a. while simultaneously continuously recirculating one of such fluids against the other fluids in a chamber for at least 10 minutes and with sufficient mixing and gas-liquid contact energy input to consume at least 60% (by volume) of the oxygen in the first feed gas. First oxygenated liquor or liquid-solid, and first unconsumed oxygen-containing gas are formed in this first cycle, the gas comprising 10–70% oxygen but of lower oxygen purity than the first feed gas and having oxygen partial pressure of at least 1.47 p.s.i.a. Because more oxygen is consumed in this cycle than gas is evolved from the liquor, the product gas quantity from the first oxygenation cycle is appreciably less than the oxygen feed gas quantity. This first unconsumed oxygen-containing gas is discharged from the chamber at the end of the first cycle, and a second oxygenation cycle is initiated having the same general parameters.

In the second cycle, a second feed gas quantity comprising at least 50% oxygen and having oxygen partial pressure of at least 7.3 p.s.i.a. is mixed with second BOD-containing water and second biomass in the same chamber while simultaneously continuously recirculating one of the fluids against the other fluids. The second cycle mixing also continues for at least 10 minutes and with sufficient mixing and gas-liquid contact energy to consume at least 60% of the oxygen in the second feed gas to form second oxygenated liquor or liquid-solid, and second unconsumed oxygen-containing gas comprising 10–70% oxygen but of lower oxygen purity than the second feed gas and having oxygen partial pressure of at least 1.47 p.s.i.a. The second unconsumed oxygen-containing gas is discharged from the chamber at the end of the second oxygenation cycle, and the first and second cycles are thereafter repeated.

The mixing liquor in this second cycle is at least in part composed of the first oxygenated liquid-solid formed in the first cycle, and unoxygenated liquor affords the balance of the second BOD-containing water and biomass. Additional oxygen feed gas may be introduced during each cycle as the oxygen is consumed, for example to maintain constant aeration gas pressure. As a further alternative, additional BOD-containing water and biomass are introduced to the chamber during the first and second oxygenation cycles.

In one embodiment, the biomass is concentrated from the oxygenated liquid-solid, for example in a clarifier, and recycled in sufficient quantity to provide volatile suspended solids content (MLVSS) of at least 3,000 p.p.m. in the first and second oxygenation cycles. In waste water embodiments the latter adds very little MLVSS as compared to the sludge (active biomass). Accordingly the sludge must have an appreciably higher MLVSS value to afford at least 3,000 p.p.m. on dilution with the waste water. For waste water systems the MLVSS comprises at least 0.55 of the total suspended solids (MLSS). By way of example, MLVSS/MLSS ratios of 0.70 to 0.75 have been measured in the treatment of wastes from two different municipalities.

One apparatus embodiment of the invention includes a liquor storage enclosure, an oxygen gas source, and at least one oxygenation chamber preferably fixedly positioned within the storage enclosure below the liquor level with its lower end in fluid communication with the storage enclosure. A gas-tight cover is provided over the chamber's upper end. Oxygen suply conduit means extend between the oxygen gas source and the oxygenation chamber, and conduit means are also provided for discharging unconsumed oxygen-containing gas from the upper portion of the oxygenation chamber. A vent valve is positioned within the gas discharge conduit. Means are included for mechanically mixing the oxygen gas and liquor in the oxygenation chamber, as for example a motor-driven surface-type aerator.

Gas flow control means for this apparatus include a gas inlet flow control valve arranged to maintain a predetermined gas pressure in the oxygenation chamber, and an inlet shutoff valve, both in the aforementioned oxygen supply conduit. Means are included for sensing gas pressure in the oxygenation chamber, with signal transmitting means from the pressure sensing means to the gas inlet flow control valve. Cycle control means are provided for simultaneously closing the gas inlet shutoff valve and opening the gas vent valve to permit venting of oxygen-depleted aeration gas (i.e. the unconsumed oxygen-containing gas) under the force of the unbalanced hydrostatic head flowing into the chamber lower end from the liquor enclosure. The chamber liquor level rises and displaces the oxygen-depleted aeration gas through the discharge conduit and vent valve. The cycle control means also performs the function of thereafter simultaneously closing the gas vent valve and opening the gas inlet shutoff valve, thereby permitting repetition of oxygen gas inlet flow through the control valve to the oxygenation chamber.

In another apparatus embodiment, an oxygen gas sparger is positioned below the liquor level in the oxygenation chamber, and gas-liquor mechanical mixing means such as a motor-driven propeller is also positioned below the liquor level. A gas blower is provided with the suction side in flow communication with the oxygenation chamber upper portion and the discharge side in flow communication with the sparger.

The gas flow control means of this apparatus embodiment includes low liquor level sensing means in the oxygenation chamber and signal transmitting means from this level sensing means arranged to close the oxygen gas inlet control valve when inflowing oxygen gas has downwardly forced the liquor level to a predetermined elevation. Means are also provided for sensing the chamber oxygen gas content, and signal transmitting means to open the chamber vent valve when the sensed oxygen gas content descends to a predetermined value. As used herein "gas content" may be either composition, e.g. oxygen purity, or pressure. High liquor level sensing means are included with signal transmitting means therefrom arranged to close the vent valve and open the oxygen gas inlet control valve when the rising liquor reaches a predetermined elevation.

The method and apparatus of this invention may be used to treat BOD-containing water in a manner significantly more efficient than the widely used air aeration treatment processes.

Figure 1:
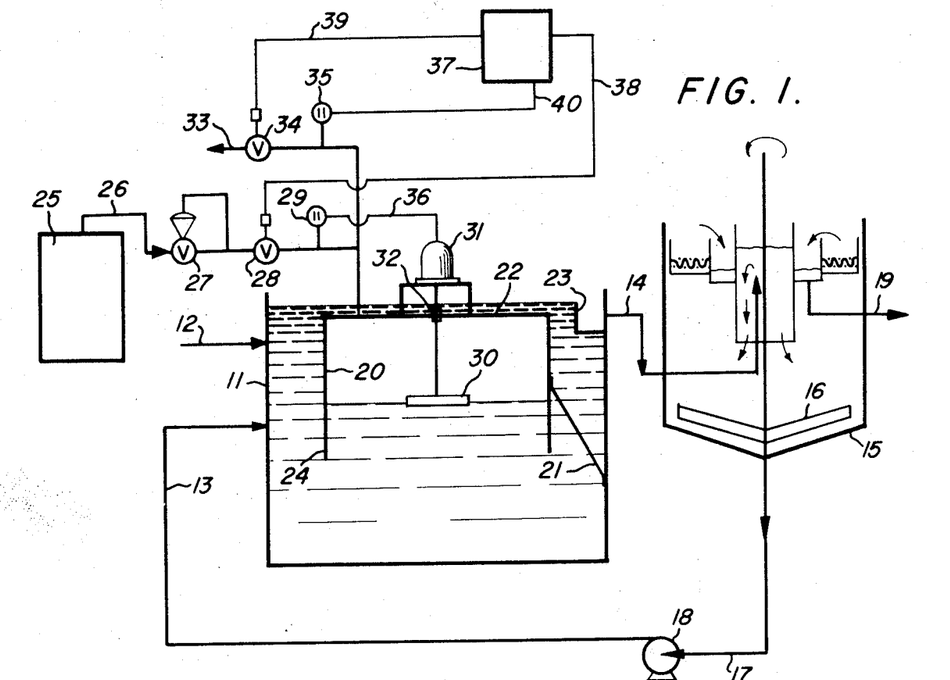
FIG. 1 is a schematic view taken in cross-sectional elevation of apparatus according to one embodiment of the invention, including a fixedly positioned oxygenation chamber and a clarifier.

Referring now to the drawings and in particular FIG. 1, BOD-containing water as for example sewage is introduced to enclosure 11 through conduit 12. Active biomass is introduced to enclosure 11 through conduit 13, although it may alternatively be premixed with the BOD-containing water and introduced through conduit 12. The biomass is preferably obtained from oxygenated liquid-solid discharged from enclosure 11 in conduit 14. Solids concentration may be practiced in clarifier 15, where the oxygenated liquid-solid is separated into purified water and concentrated biomass. Clarifier constructions are well-known to those skilled in the bio-oxidation art, and may for example include a rotatable scraper 16 at the lower end to prevent coning of the concentrated biomass. The latter is withdrawn from clarifier 15 through conduit 17 and at least a portion thereof is recycled through pump 18 to conduit 13 for introduction to liquor enclosure 11. The purified water is discharged from clarifier 15 through conduit 19. In the embodiment wherein waste comprises the BOD-containing feed water, the recycled solid is commonly referred to as activated sludge.

Oxygenation chamber 20 is fixedly positioned in enclosure 11 below the liquor level by members 21, with gas-tight cover 22 below the edge of discharge weir 23. The lower end 24 of oxygenation chamber 20 is in fluid communication with enclosure 11. The system also requires oxygen gas source 25, which may for example be a pressurized gas container or a thermally insulated liquid vessel with vaporizing means. Oxygen gas supply conduit 26 communicates between gas source 25 and oxygenation chamber 20. Gas inlet control valve 27 and shutoff valve 28 are both provided in supply conduit 26, with valve 28 preferably downstream of control valve 27. First pressure switch 29 may also be provided in oxygen supply conduit 26 if desired, but is not essential.

The feed gas must comprise at least 50% oxygen so that the gas-liquor mixing time (to achieve at least 60% consumption of the introduced oxygen) does not become prohibitively short, i.e. less than 10 minutes. The "turn around" time required at the end of each cycle for venting the waste gas, recharging the aeration chamber with oxygen gas, and restarting the mixer is normally 2–3 minutes. Accordingly, if the mixing time decreases below 10 minutes the "turn around" period of non-mixing becomes an excessively large and ineffective portion of the total cycle time, despite the lower cost of low purity oxygen. Sufficient oxygen feed gas is introduced to provide oxygen partial pressure of at least 7.3 p.s.i.a., so that the gas-liquor mixing will be performed at least at atmospheric pressure. Sub-atmospheric pressures are to be avoided because of the resulting increased "turn-around" period, lower oxygen transfer rate, and possible atmospheric in-leak to the oxygenation chamber.

For purposes of this description, the BOD-containing water and biomass in enclosure 11 will be referred to as "liquor." Means are provided for mixing oxygen gas and liquor within oxygenation chamber 20, as for example a rotating surface-type impeller 30 powered by electric motor 31. The latter two components are joined by a shaft suitably sealed by collar 32 against gas leakage through a central opening in the chamber cover 22.

Discharge conduit 33 communicates with the upper portion of oxygenation chamber 20 for release of unconsumed oxygen-containing (spent) gas. Vent valve 34 is provided in discharge conduit 33 and second pressure switch 35 may be positioned therein upstream of valve 34.

The practice of a method aspect of the invention will now be described using the FIG. 1 apparatus. Assuming that the cycle begins with the oxygenation chamber 20 substantially completely filled with liquor and with the mixer 30 de-energized, vent valve 34 is closed and shut-off valve 28 is opened by the cycle control means. In this manner, first feed gas comprising at least 50% oxygen (by volume) and having oxygen partial pressure of at least 7.3 p.s.i.a. is introduced to chamber 20 and thereby progressively downwardly displaces a portion of the liquor from the upper end thereof into the liquor enclosure 11. Pressure switch 29 senses the gradually rising feed gas pressure in conduit 26 and when a predetermined value is reached, a signal is transmitted through means 36 to energize motor 31 and initiate mixing of gas and liquor. Alternatively the mixer 30 may be continuously operated during even the gas discharge step of each cycle, and in this event first pressure switch 29 is not required. The advantage of including mixer energizing and deenergizing components in the cycle control means is that energy for operating the mixer is consumed only when mixing is needed.

Gas inlet flow control valve 27 comprises one component of the system's gas flow control means, and is set to maintain the oxygenation chamber gas pressure at a predetermined level. This pressure is above atmospheric and preferably 15–25 p.s.i.a. If first pressure switch 29 is employed, this predetermined level may be the same as or greater than that at which mixer motor 31 is energized. During the mixing step of each cycle, only sufficient oxygen gas is introduced through conduit 26 to replace the net mass transfer of gas into the liquor. As nitrogen and carbon dioxide impurities evolve from the mixed liquor into the overhead gas space, the oxygne content gradually declines. The mixing step of each cycle continues for at least 10 minutes and with sufficient mixing and gas-liquor contact energy to consume at least 60% (by volume) of the oxygen in the feed gas. As used in the description of this embodiment, "feed gas" comprises the gas initially introduced to reach the predetermined pressure plus any gas introduced during mixing to maintain this pressure.

It should be recognized that the manner in which power is used represents an important part of this invention. Two functions must be provided: The solids must be held in suspension in the liquor (to maintain the liquor-state), and the oxygen gas and liquor must be contacted intimately. In many previous aeration systems using air, the two functions were served by the air alone. The air volume was large, as required to provide the necessary oxygen from a gas highly diluted with nitrogen, and the stirring action of the gas on the liquor, while inefficient, was adequate to hold the solids in suspension.

In this efficient oxygen aeration system, the quantity of gas needed to supply the oxygen is much smaller and does not provide the mixing action needed to suspend the solids, especially when solids loadings are high. The energy needed for stirring the liquor is preferably supplied by a mechanical agitator or propeller, which is considerably more efficient in this respect than gas bubbling. The stirrer may be a different device from the gas-liquor contactor, as for example, a submerged propeller in conjunction with an additional gas sparger. Optionally, the two functions may be served by the same device but, in either event, the device should be of a type which sustains a high oxygen partial pressure differential across the gas-liquor interfacial area generated by the device.

The energy required for gas-liquor contact is substantially less than the energy required by the solid-liquid suspension. The gas-liquor contact energy is nevertheless significant, and unless the contacting method is properly chosen, the power consumption for this function can become excessive. Moreover, the DO (dissolved oxygen) level and oxygen utilization may suffer. A device should be chosen which generates a large amount of interfacial area between gas and liquor, yet which does not produce a fine dispersion of liquid in the gas. Considerable power is required to produce fine liquid dispersions and such dispersions represent relatively inefficient mass transfer functions for this system. Suitable mixing devices produce a large contact area in a large volume of liquor, such that the liquor adjacent the interfacial area does not approach saturation. The oxygen partial pressure driving forces for rapid solution are therefore sustained, and mixing losses are reduced when the liquor in the contacting zone returns to the main pool. Satisfactory mixing devices include spargers which produce fine bubbles in the liquid pool and surface aerators which throw relatively massive sheets or streams of liquid into the gas. Suitable devices are commonly characterized by the so-called "air standard transfer efficiency." This performance parameter relates the rate of oxygen dissolution per unit of input horsepower from atmospheric pressure air into zero DO tap water at 20° C. Suitable devices would have an air standard transfer efficiency of at least 1.5 lb. $O_2$/H.P. hrs.

One feature of this method is a balance between the overall level of oxygen consumption in the liquor, and the average oxygen energy transfer efficiency to the liquor. Extremely high overall percentage oxygen absorption may be realized by continuing the mixing until virtually all of the oxygen in the feed gas is consumed. However, the energy transfer efficiency would become prohibitively low, with extremely high dissolution power and capital investment costs. It has been discovered that these opposing characteristics may be balanced in a method vastly superior to the prior art by continuing the gas-liquor mixing step for at least 10 minutes but for sufficient duration to consume at least 60% of the oxygen in the feed gas to form first oxygenated liquid-solid and first unconsumed oxygen-containing gas. The latter comprises 10-70% oxygen, but is of lower oxygen purity than the feed gas and has oxygen partial pressure of at least 1.47 p.s.i.a. That is, if the gas discharged from the chamber at the end of the mixing step comprises only 10% oxygen, it will be discharged at least at atmospheric pressure. Sub-atmospheric pressure is to be avoided for the previously indicated reasons. In a preferred embodiment the feed gas comprises at least 90% oxygen, mixing is continued for at least 20 minutes, at least 75% of the oxygen is consumed and the unconsumed oxygen-containing gas comprises 40 to 60% oxygen.

It is preferred to introduce oxygen at cycle average feed rates of 0.10–0.50 lb. moles per horsepower hour of the mechanical mixing and gas-liquor contact energy during each of the succeeding oxygenation cycles. Lower feed rates limit the rate of oxygen dissolution into the liquor and higher oxygen feed rates provide more oxygen than can be effectively mixed by this level of energy input and nominal gas-liquor contacting effectiveness.

It is also preferred to introduce oxygen at cycle average feed rates of 0.08–2.0 cu. ft. per cu. ft. of liquor. Lower oxygen feed rates limit the biochemical oxidation reaction rate and higher rates provide more oxygen than can be dissolved in the liquor per unit time.

The cycle control means also simultaneously close feed gas shut-off valve 28 and open gas vent valve 34 at the end of the gas-liquor mixing step of each cycle. As previously indicated, the mixer motor 31 may also be de-energized through signal transmitting means 36 at this point in the cycle. These changes may be instigated by any of several well-known process monitoring means illustrated schematically as controller 37. By way of illustration, an automatic preset timer could be employed and joined to valves 28 and 34 respectively by signal transmitting means 38 and 39. A timer would be most suited for relatively stable process conditions and long cycles. It should be noted, however, that the set period of such a timer could be altered by suitable controls to compensate for variations in the volume and strength of BOD-containing water fed to the system. Other compensation can be made for changes in DO level of the mixed liquor, for example by increasing or decreasing the power input to mixer motor 31 and altering its speed of mixer rotation.

If the process conditions or the oxygen demand fluctuate significantly, it may be necessary to provide means for continuously analyzing the oxygen purity of the gas in oxygenation chamber 20. The valve changes would then be initiated by a signal from the analyzer (not illustrated) indicating that the oxygen purity within the aeration chamber 20 has declined to a predetermined value. The preferred purity for this step change depends on the feed gas purity and the relative costs of oxygen, oxygenator investment and power. For oxygen feed gas purities of at least 90 percent, the spent gas discharge step is preferably initiated at purities of 40 to 60%.

The spent oxygenation gas is vented through conduit 33 under the force of the unbalanced hydrostatic head which causes the chamber 20 liquor level to rise and displace the gas. For this reason, the chamber must be fixedly positioned below the liquor level, i.e. the edge of weir 23 is above chamber cover 22. The cycle control means senses the end of the gas discharge step, simultaneously closing vent valve 34 and opening shut-off valve 28. This may for example be accomplished by second pressure switch 35 set to operate at the reduced hydrostatic head in the oxygenation chamber attained when the liquor level rises to near cover 22. Signal transmitting means 40 joins second pressure switch 35 to controller 37. The latter in turn communicates respectively with gas inlet shut-off valve 28 and vent valve 34 through signal transmitting means 38 and 39.

The aforedescribed cycle sequence is thereafter repeated in at least a second oxygenation cycle wherein a second feed gas quantity comprising at least 50% oxygen and having oxygen partial pressure of at least 7.3 p.s.i.a. is introduced to chamber 20 through conduit 26 for mixing with second BOD-containing water and second biomass. This liquor is preferably composed at least in part by the first oxygenated liquid-solid, i.e. the product liquor from the first cycle. The degree to which the first cycle product liquor comprises the second cycle feed liquor depends on several factors, including the relative sizes of the oxygenation chamber 20 and liquor storage enclosure 11, the liquor and gas flow rates, the feed gas oxygen purity, the gas-liquor contact energy and mixing time, and the desired effluent water BOD-level. It should be understood that under some circumstances it may be desirable to discharge the first oxygenated liquid-solid through conduit 14 at the end of the first oxygenation cycle, and thereafter introduce the second BOD-containing water and second biomass through conduits 12 and 13, respectively, before introduction of the second feed gas through conduit 26 to chamber 20. The second and succeeding oxygenation cycles are performed in an analogous manner. This constitutes a batch-type treatment of BOD-containing water according to the invention.

As still another embodiment, additional BOD-containing water and biomass may be introduced to enclosure 11 during each of the first and second oxygenation cycles.

Figure 2:
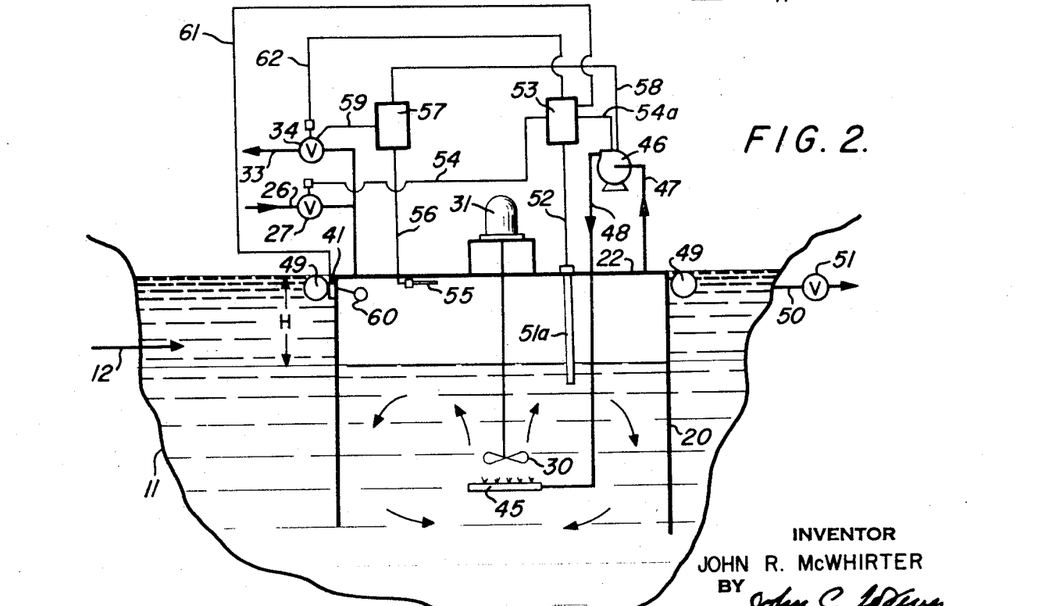
FIG. 2 is a schematic view taken in cross-sectional elevation of another embodiment characterized by a floating oxygenation chamber, with a submerged propeller and gas sparger as the gas-liquor mixing means.

The FIG. 2 embodiment differs from FIG. 1 in several respects. Liquor storage enclosure 11 is a naturally occurring reservoir, as for example a lagoon. The active biomass is sludge circulated within the lagoon by natural flow and submerged propeller 30. Part of this sludge gravity settles to the lagoon bottom and may be periodically removed therefrom by dredging means. Depending on the relative positioning of the BOD-containing water feed conduit 12 and oxygenator 20, the feed liquid and sludge mixing may, and in fact usually does occur prior to contact with the oxygen gas in oxygenator 20.

The FIG. 2 mixing means includes sparger 45 submerged in the liquor beneath impeller 30. The oxygen-containing gas bubbles discharged from sparger 45 are distributed through chamber 20 in intimate contact with the liquor and rise to the surface where the unconsumed portion disengages into the gas space along with the reaction product gases. To provide the necessary pressure driving force for continuous circulation of oxygen gas through chamber 20, the inlet of compressor or blower 46 is positioned in gas flow communication with the chamber gas space as by conduit 47, and the discharge thereof is directed through conduit 48 to sparger 45.

When a submerged propeller and sparger are employed as in FIG. 2, the system should be operated such that the local downward velocity of liquor is not sufficient to sweep the dispersed gas bubbles below the chamber lower end and outwardly into the uncovered portion of the liquor storage enclosure. The gas must be substantially confined within the chamber and recirculated. The local downward liquid velocity should be less than the terminal velocity of bubbles produced by the sparger to insure that the bubbles will rise.

Although the oxygenation chamber 20 and other connected apparatus may be fixedly positioned in a lagoon, the FIG. 2 embodiment is arranged to float therein and is supported by flotation collar 49. A separate clarifier is not employed and the purified water is discharged through conduit 50 having control valve 51 therein.

The practice of the instant method will be described in connection with the FIG. 2 apparatus, starting with the introduction of a first oxygen-containing feed gas quantity through conduit 26 and flow control valve 27, with vent valve 34 in gas discharge conduit 33 being closed. The liquor level in oxygenator 20 is thereby depressed relative to cover 22, and liquor is forced back into the surrounding lagoon 11. Propeller 30 may be continuously operated during this gas charging period if desired, and the gas flow control means may be used to energize motor-driven blower 46 for gas recirculation when the chamber is filled with the first quantity of oxygen-containing feed gas such that the liquor level reaches desired level "H" relative to cover 22 of chamber 20. This function may be performed by low liquor level sensing means as for example probe 51a. Signal transmission means 52 joins probe 51a with controller 53, which in turn transmits a signal through means 54 to close oxygen feed valve 27. Controller 53 simultaneously energizes blower 46 through signal transmission means 54a.

In this embodiment, oxygen gas is not continuously introduced to chamber 20 as makeup for that consumed by the liquor, so that the quantity of gas therein continuously decreases as well as its oxygen purity. The gas flow control system includes means for sensing the chamber gas content, as for example probe 55 for monitoring the oxygen gas purity. Upon reaching a low predetermined oxygen concentration, a signal is transmitted through means 56 to second controller 57 which in turn initiates a cycle change by deenergizing recirculation blower 46 through signal transmission means 58 and opening vent valve 34 in discharge conduit 33 through signal transmission means 59. First unconsumed oxygen-containing gas is expelled by first oxygenated liquid-solid and unoxygenated liquor rising in the chamber 20 and when the level rises to near chamber cover 22, float switch 60 is actuated as part of the gas flow control means and in turn transmits a signal through means 61 to controller 53. The latter in turn sends a signal through means 54 to reopen oxygen feed valve 27 and another signal through means 62 to simultaneously close vent valve 34. The second aeration cycle is thus initiated and oxygen gas flows into chamber 20 until terminated by a signal from low liquor level probe 51a, as previously described.

Figure 3:
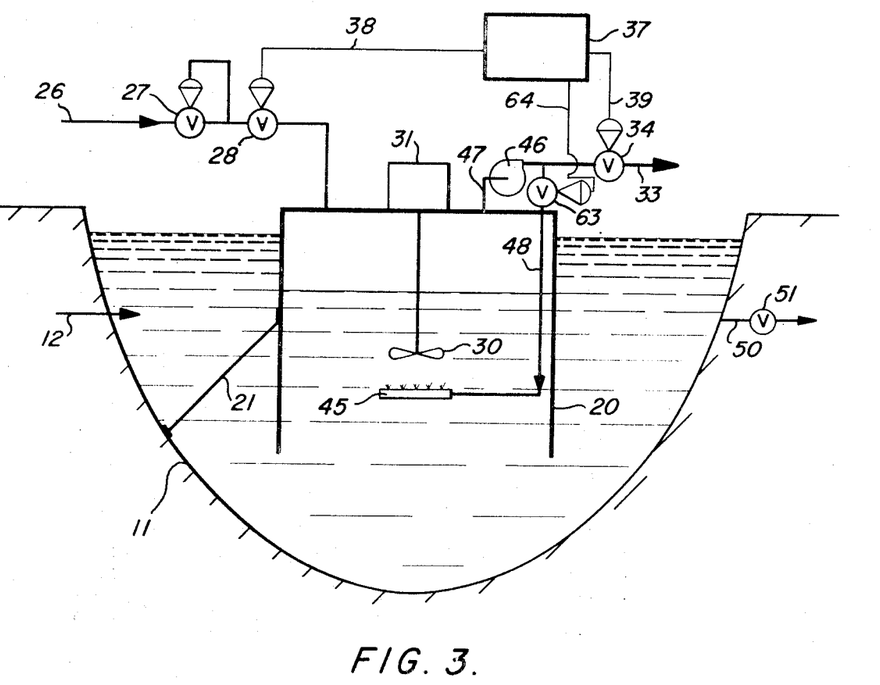
FIG. 3 is a schematic view taken in cross-sectionial elevation of still another embodiment characterized by a gas cycle control system utilizing a recirculation blower for exhausting oxygen-depleted gas.

FIG. 3 illustrates another embodiment wherein gas recirculation blower 46 is used to exhaust the unconsumed oxygen-containing gas from oxygenation chamber 20 at the end of the gas-liquor mixing step of each cycle. This feature allows greater flexibility in locating the oxygenation chamber 20 relative to the liquor storage enclosure 11, as the rising liquor level is not relied on to force out the unconsumed oxygen-containing gas. The gas flow control system includes cycle controller 37 which may for example be a timer or a gas purity analyzer plus a timer. Controller 37 is joined to feed gas shut-off valve 28 by signal transmitting means 38 and also joined to vent valve 34 (in gas discharge conduit 33) by signal transmitting means 39. Gas discharge conduit 33 branches from the discharge side of blower 46.

During the gas discharge step valve 63 in the oxygenation gas recycle conduit 48 is closed, and the unconsumed oxygen-containing gas is withdrawn by blower 46 for release to the atmosphere through opened vent valve 34 in conduit 33. At the completion of this step, cycle controller 37 closes vent valve 34 through means 39 while simultaneously opening feed gas shutoff valve 28 through means 38 and oxygenation gas recycle valve 63 through means 64. A predetermined gas pressure may then be maintained in chamber 20 during the gas-liquor mixing step by gas inlet flow control valve 27, as described in connection with FIG. 1.

It should be appreciated that whereas single oxygenators have been illustrated and described in FIGS. 1–3 for simplicity, a plurality of oxygenators may be positioned in a liquor storage reservoir and either connected in parallel flow relation to the same oxygen gas source, individually connected thereto, or joined to different oxygen gas sources. Moreover, all oxygenators may be operated identically or each may operate wholly independent of the others, e.g. on different cycle times, different maximum impurity levels in the gas before starting the spent gas discharge step, different gas recirculation rates (if blower 46 is employed) and different power inputs to the various mixers.

Such flexibility of operation may be particularly advantageous where the liquor reservoir is a large basin or lagoon for waste, since the BOD level will normally be higher near the waste inlet and consequently the oxygen demand will be greater in that zone.

Figure 4:
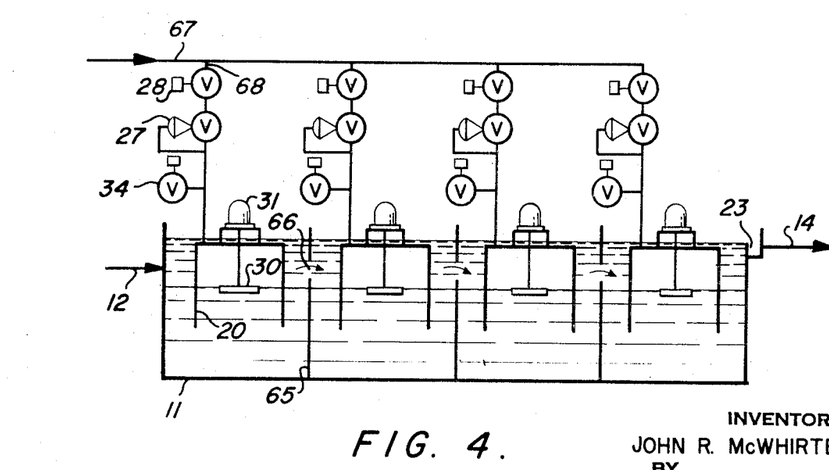
FIG. 4 is a schematic view taken in cross-sectional elevation of a multiple oxygenation chamber embodiment with staging of oxygenated liquid-solid.

FIG. 4 illustrates another multiple oxygenator arrangement wherein the liquor storage enclosure is a tank 11 having vertical partitions 65 extending across the tank width from the bottom to above the liquor level. Partitions 65 together with the tank walls form a series of compartments joined by restricted flow openings 66 between adjacent compartments. One or more oxygenation chambers 20 may be positioned in each compartment with the rotating surface-type impeller 30 powered by electric motor 31, as illustrated in FIG. 1. Oxygen gas is provided by manifold conduit 67 joined to each of the multiple, e.g. four oxygenation chambers through branch conduits 68. The latter contain gas inlet flow control valve 27, shut-off valve 28, and vent valve 34. Although not illustrated in the interest of simplicity, gas flow control means as described in any of the single oxygenator chamber embodiments of FIGS. 1–3 may be employed with modifications which will be apparent to those skilled in the art. Whereas the spent gas is discharged from each chamber 20 through its particular vent valve 34, the oxygenated liquid-solid is flowed in stage-to-stage manner from the compartment nearest BOD-containing water feed conduit 12 through restricted openings 66 to the compartment from which the oxygenated liquid-solid is discharged over weir 23 and through conduit 14. As the feed liquor for a particular compartment comprises the oxygenated liquid-solid from the immediately preceding compartment, the BOD content progressively decreases in the liquor from stage-to-stage.

The invention will be more fully understood by the following example in which apparatus similar to the FIG. 1 embodiment is used to cyclically oxygenate municipal-type waste liquor at 30° C. in a single stage treatment with 99.5% oxygen gas at constant gas pressure. A single surface-type aerator of 100 horsepower rating is used and the "air standard transfer efficiency" is assumed to be 3.00 lbs. $O_2$/H.P.-hr. A separate clarifier is not employed but the active biomass is provided by forced circulation of activated sludge in the manner of FIG. 2. The "alpha" factor (ratio of aerator mass transfer efficiency in mixed liquor to that in pure tap water) was assumed to be 0.90, and the "beta" factor (ratio of equilibrium concentration of dissolved oxygen in mixed liquor to that in pure tap water) was assumed to be 0.95. The aerator is positioned in a 30 feet diameter cylindrical chamber 4.0 feet deep (including 3.5 feet high gas space), the chamber volume being 2,830 cu. ft. The chamber is in turn positioned in a liquor storage enclosure which is also cylindrical and has the following dimensions: 65 feet diameter, 20 feet deep, and 496,000 gallons liquor capacity.

Biochemical oxidation parameters for this example are listed in Table I, and are typical for a high rate activated sludge process treating municipal sewage.

TABLE I

| | |
|---|---|
| Feed BOD | 240 p.p.m. |
| Effluent BOD | 25 p.p.m. |
| Feed flow rate | 16 million gallons/day. |
| Oxygen consumption rate | 200 p.p.m./hr. |
| Lb. $O_2$ consumed/lb. BOD removed | 0.70 |
| Feed liquid concentration: | |
| $O_2$ | 0.0 p.p.m. |
| $N_2$ | 13.2 p.p.m. |
| $CO_2$ | 0.39 p.p.m. |
| Mean oxygenation time for feed liquid | 50 minutes. |
| Total cycle time (oxygenation plus venting) | 53 minutes. |
| BOD loading | 423 lbs. BOD/day 1000 ft.$^3$. |

Figure 5:
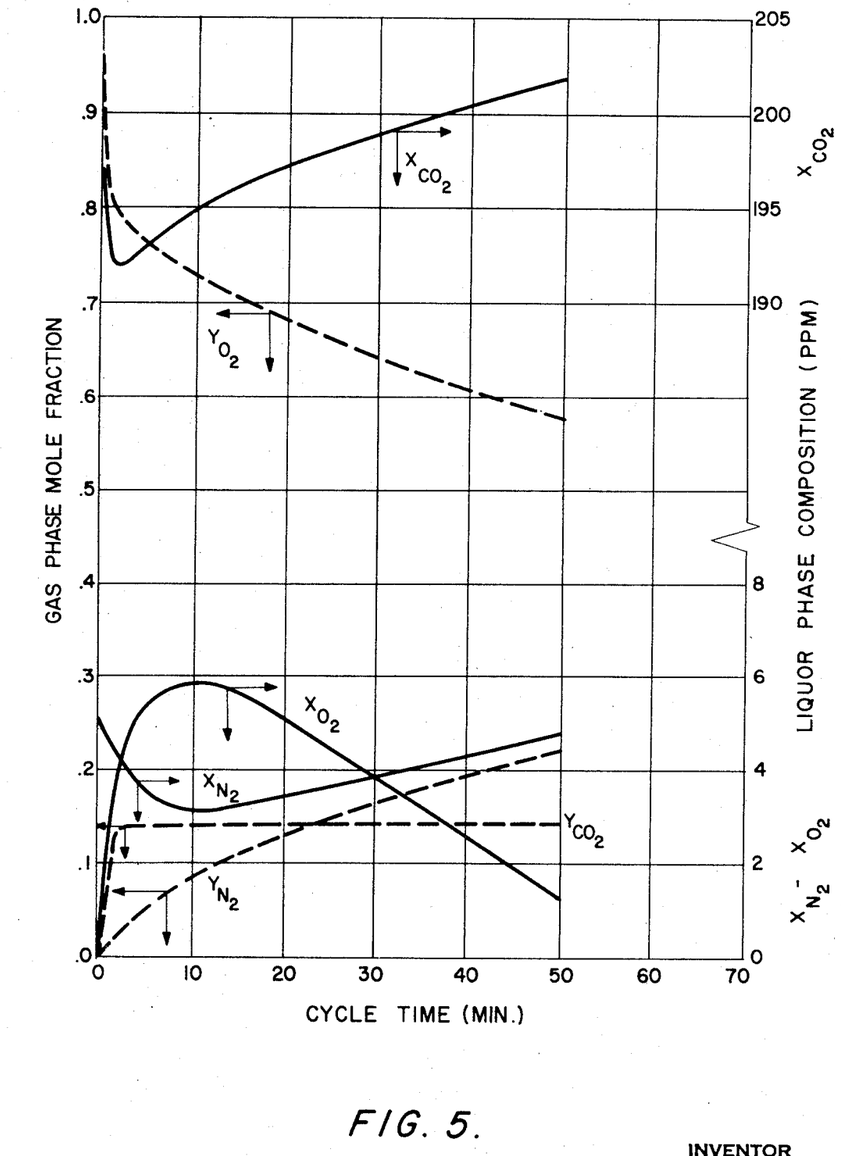
FIG. 5 is a graph showing the gas and liquor compositions in terms of oxygen, nitrogen and carbon dioxide as a function of cycle time for the oxygenation step of a typical cycle using municipal waste as feed.
Figure 6:
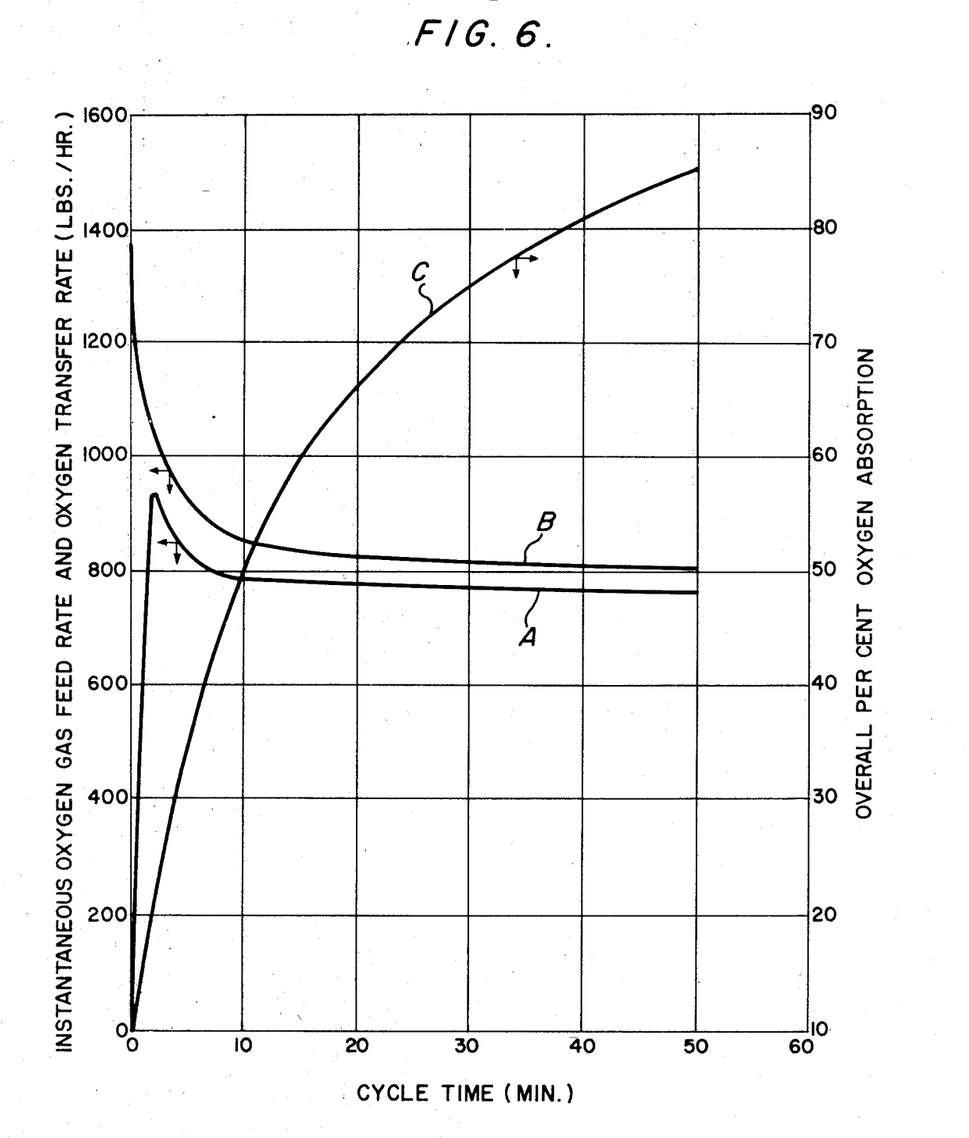
FIG. 6 is a graph showing the variation of instantaneous oxygen feed rate, oxygen transfer rate to the liquor, and the cumulative overall percentage oxygen absorption during the FIG. 5 cycle.

FIGS. 5 and 6 show the relation of certain process variables and performance parameters with time for 85% oxygen absorption and 50 minutes cycle mixing time. In particular, FIG. 5 illustrates the gas phase mole fraction (left side ordinate) and liquor phase composition in p.p.m. (right side ordinate) for oxygen, nitrogen and carbon dioxide. It will be apparent that the oxygen gas partial pressure ($Y_{O_2}$) rapidly decreases during the first several minutes of oxygenation as the $CO_2$ content of the oxygenation gas rapidly increases ($Y_{CO_2}$). Fortunately, however, since $CO_2$ is about 35 times more soluble in the liquor (BOD-containing feed water and biomass) than is oxygen, the oxygenation gas rapidly reaches $CO_2$ equilibrium with the mixed liquor at a relatively low $CO_2$ partial pressure—a $Y_{CO_2}$ of about 0.14. This means that despite the continuous formation of additional $CO_2$ by virtue of the biochemical reaction, the $CO_2$ concentration of the oxygenation gas remains virtually constant after the first few minutes, thereby minimizing its effect on the oxygen partial pressure. In contrast to $CO_2$, the nitrogen content of the oxygenation gas ($Y_{N_2}$) gradually increases as the oxygen content decreases ($Y_{O_2}$), and the gas-liquor mixing step of the cycle is terminated when the oxygen partial pressure has declined to a level at which oxygen is no longer effectively consumed by the liquor. In this example, the $Y_{O_2}$ at the end of the 50 minute cycle is 0.58 or 8.5 p.s.i.a. at atmospheric pressure. The unconsumed oxygen-containing gas is discharged in about 3 minutes to complete each cycle.

The liquor phase oxygen, nitrogen and carbon dioxide contents also vary considerably during each cycle. The DO content initially increases very rapidly at the start of the cycle when the oxygen partial pressure ($Y_{O_2}$) and hence oxygen transfer rate to the liquor are high. The DO reaches a peak of about 5.9 p.p.m. after about 10 minutes and then gradually decreases to approximately the initial DO level at the end of the cycle mixing step. The $X_{N_2}$ and $X_{CO_2}$ contents vary in the reverse manner as $X_{O_2}$ since they are being desorbed from the liquid at initially very high rates (due to high rate of oxygen absorption) and then at necessarily lower rates during the remainder of the cycle. As this example represents periodic steady state conditions, the liquor phase concentrations are equal at the beginning and end of the cycle as are the gas phase concentrations.

FIG. 6 shows the changes in instantaneous oxygen feed gas rate (curve A), instantaneous oxygen transfer rate to the liquor (curve B), and the cumulative overall percentage oxygen absorption throughout the cycle mixing step (curve C). The oxygen feed gas rate is initially zero and rapidly rises to a peak, then quickly decays to a gradually decreasing rate. The feed rate is initially zero at the start of the cycle due to the extremely high $CO_2$ desorption rate (see $Y_{CO_2}$ of FIG. 5). This condition prevails for only about 30 seconds, however, and the oxygenation chamber pressure increase and liquor level change is negligible.

Table II summarizes the pertinent oxygenation performance parameters and compares them to air aeration performance capability at the same mixed liquor DO level.

TABLE II

| | |
|---|---|
| Percent oxygen absorption | 85 |
| Length of cycle mixing step (min.) | 50 |
| Time average energy transfer efficiency (lbs. $O_2$/H.P. hr.) | 8.50 |
| Time average liquor phase compositions (p.p.m.): | |
| Oxygen | 4.00 |
| Nitrogen | 3.87 |
| Carbon dioxide | 198 |
| Air operation energy transfer efficiency at same mixed-liquor conditions and DO level (lbs. $O_2$/H.P. hr.) | 1.48 |
| Air operation energy transfer efficiency at same mixed liquor conditions and DO level of 2.0 p.p.m. (lbs. $O_2$/H.P. hr.) | 2.04 |

Table II shows that an overall oxygen absorption efficiency of at least 85 percent can be obtained while maintaining about a five-fold increase in average energy transfer efficiency relative to air operation at the same mixed liquor conditions. Relative to a DO level of 2.0 p.p.m. which is characteristic of current air operation, a four-fold increase in efficiency is attainable. It is thus apparent that the invention affords substantially higher oxygen absorption and average energy transfer efficiency than conventional air aeration of BOD-containing water, as for example municipal waste.

The use of a multiplicity of individually-cycled oxygenators in a single mixed-liquor enclosure would largely dampen out the liquor phase concentration fluctuations shown in FIG. 5 ($X_{O_2}$, $X_{N_2}$, and $X_{CO_2}$), and afford a more uniform liquor composition. The time average mixed-liquor compositions of Table II should be quite similar to the average liquor compositions obtained in a multiple oxygenator system. Accordingly, the time average energy transfer efficiencies of Table II are also representative for multiple oxygenators.

Although certain embodiments have been described in detail, it will be appreciated that other embodiments are contemplated along with modifications of the disclosed features, as being within the scope of the invention.

What is claimed is:

1. A method for treatment of BOD-containing water by cyclic oxygenation in contact with biomass comprising: as a first oxygenation cycle mixing said BOD-containing water and biomass as liquor and a first feed gas quantity comprising at least 50% oxygen (by volume) and having oxygen partial pressure of at least 7.3 p.s.i.a. while simultaneously continuously recirculating one of such fluids against the other fluids in a chamber for at least 10 minutes and with sufficient mixing and gas-liquor contact energy input to consume at least 60% (by volume) of the oxygen in said first feed gas to form first containing gas over said first oxygenated liquid-solid comprising 10–70% oxygen but of lower oxygen purity than said first feed gas and having oxygen partial pressure of at least 1.47 p.s.i.a.; discharging said first unconsumed oxygen-containing gas from said chamber; as a second oxygenation cycle, mixing in said chamber a second feed gas quantity comprising at least 50% oxygen (by volume) and having oxygen partial pressure of at least 7.3 p.s.i.a., second BOD-containing water and second biomass while simultaneously continuously recirculating one of such fluids against the other fluids for at least 10 minutes and with sufficient mixing and gas-liquid contact energy to consume at least 60% (by volume) of the oxygen in said second feed gas to form second oxygenated liquid-solid and second unconsumed oxygen-containing gas over said second oxygenated liquid-solid comprising 10–70% oxygen but of lower oxygen purity than said second feed gas and having oxygen partial pressure of at least 1.47 p.s.i.a., said second BOD-containing water and second biomass being composed at least in part of said first oxygenated liquid-solid; and discharging said second unconsumed oxygen-containing gas from said chamber.

2. A method according to claim 1 wherein additional BOD-containing water and biomass are introduced to said chamber during each of said first and second oxygenation cycles.

3. A method according to claim 1 in which said biomass is concentrated from said oxygenated liquid-solid and recycled in sufficient quantity to provide volatile suspended solids content of at least 3000 p.p.m. in said first oxygenation cycle.

4. A method according to claim 1 in which said chamber is substantially filled with liquor on discharging of unconsumed oxygen-containing gas therefrom at completion of an oxygenation cycle, said first feed gas is thereafter introduced and progressively downwardly displaces the liquor from the chamber upper portion, and the mixing of said first oxygenation cycle is initiated when the liquor is displaced to a predetermined chamber lower level.

5. A method according to claim 4 in which part of said first feed gas is introduced during the mixing of said first oxygenation cycle.

6. A method according to claim 4 in which part of said first feed gas is introduced during the mixing of said first oxygenation cycle to maintain constant gas pressure and volume in said chamber.

7. A method according to claim 4 in which the lower end of said chamber is in fluid communication with a surrounding liquor storage enclosure and said first unconsumed oxygen-containing gas is discharged from said chamber by a rising hydrostatic head of liquor in the chamber.

8. A method according to claim 1 wherein gas disengaging from the liquor during the mixing is continuously recirculated and reintroduced to said liquor.

9. A method according to claim 1 in which the oxygen feed gas is mechanically mixed with said liquor at average rate of 0.10–0.50 lb. moles $O_2$ per horsepower hour of mixing and gas-liquor contact energy input.

10. A method according to claim 1 in which the oxygen feed gas is mixed with said liquor at average rate of 0.08–2.0 cu. ft. $O_2$ per cu. ft. liquor.

11. A method according to claim 1 wherein said feed gas comprises at least 90% oxygen, gas-liquor mixing is for at least 20 minutes, at least 75% of the oxygen is consumed and the unconsumed oxygen-containing gas comprises 40–60% oxygen.

12. A method for cyclic treatment of sewage by oxygenation in contact with activated sludge comprising:
(a) providing said sewage and activated sludge as liquor within and substantially filling a chamber having a closed upper end and a lower end in fluid communication with a surrounding liquor storage enclosure;
(b) introducing first feed gas comprising at least 50% oxygen (by volume) of said chamber in sufficient quantity to provide oxygen partial pressure of at least 7.3 p.s.i.a. and progressively downwardly displace the liquor from the chamber upper portion to a predetermined chamber lower level;
(c) as a first oxygenation cycle, mechanically mixing said first feed gas, sewage and activated sludge for at least 10 minutes while simultaneously continuously recirculating one of such fluids against the other fluids and also simultaneously introducing only sufficient additional first feed gas to maintain constant gas pressure in said chamber to form first oxygenated liquid-solid and first unconsumed oxygen-containing gas comprising 10–70% oxygen but of lower oxygen purity than said first feed gas and having oxygen partial pressure of at least 1.47 p.s.i.a., the mixing and gas-liquid contact energy input being sufficient to consume at least 60% (by volume) of the oxygen in said first feed gas;
(d) discharging said first unconsumed oxygen-containing gas from said chamber by a rising hydrostatic head of liquor in the chamber until the latter is substantially filled with liquor; and
(e) thereafter consecutively repeating steps (b), (c) and (d) as subsequent oxygenation cycles.

13. Apparatus for cyclic oxygenation of BOD-containing water comprising:
(a) a liquor storage enclosure;
(b) an oxygen gas source;
(c) an oxygenation chamber having a wall extending below the liquor level within said storage enclosure and its lower end in fluid communication with the enclosure, and a gas-tight cover;
(d) oxygen supply conduit means between said oxygen gas source and said oxygenation chamber;
(e) means for mechanically mixing said oxygen gas and said liquor in said oxygenation chamber;
(f) conduit means for discharging unconsumed oxygen-containing gas from the upper portion of said oxygenation chamber and having a vent valve therein; and
(g) gas flow control means comprising: a gas inlet flow control valve arranged to maintain a predetermined gas pressure in said oxygenation chamber, and a shut-off valve in said oxygen supply conduit; means for sensing gas pressure in said oxygenation chamber; signal transmitting means from the pressure sensing means to said gas inlet flow control valve; and cycle control means for simultaneously closing said shut-off valve and opening the gas vent valve, and thereafter simultaneously closing said gas vent valve and opening said shutoff valve.

14. Apparatus for cyclic oxygenation of BOD-containing liquor comprising:
(a) a liquor storage enclosure;
(b) an oxygen gas source;
(c) an oxygenation chamber within said storage enclosure having its lower end in fluid communication with the enclosure, and a gas-tight cover;
(d) oxygen supply conduit means between said oxygen gas source and said oxygenation chamber and having a gas inlet flow control valve therein;
(e) an oxygen gas sparger positioned below the liquor level in said oxygenation chamber;
(f) gas-liquid mechanical mixing means positioned below the liquor level in said oxygenation chamber;
(g) a blower with the suction side in flow communication with the oxygenation chamber upper portion and the discharge side in flow communication with said sparger;
(h) conduit means for discharging unconsumed oxygen-containing gas from the oxygenation chamber upper portion and having a vent valve therein; and
(i) gas flow control means comprising: low liquor level sensing means associated with said oxygenation chamber; signal transmitting means from such low level sensing means arranged to close said gas inlet control valve when inflowing oxygen gas has downwardly forced the liquor level to a predetermined elevation; means for sensing the chamber gas content; signal transmitting means to open said vent valve when the sensed gas content descends to a predetermined value; high liquor level sensing means; signal transmitting means from such high level sensing means arranged to close said vent valve and open said gas inlet control valve when the rising liquor reaches a predetermined elevation.

References Cited

UNITED STATES PATENTS

| | | | |
|---|---|---|---|
| 1,242,445 | 10/1917 | Ittner | 261—87 |
| 2,380,465 | 7/1945 | Proudman | 210—220X |
| 3,049,489 | 8/1962 | Ciabattari | 210—15 |
| 3,054,602 | 9/1962 | Proudman | 210—15X |
| 3,342,727 | 9/1967 | Bringle | 210—220X |
| 3,356,609 | 12/1967 | Bruemmer | 210—7 |
| 3,401,113 | 9/1968 | Pruessner et al. | 210—15X |
| 3,412,017 | 11/1968 | Abson et al. | 210—7 |

OTHER REFERENCES

Grant, S., et al.: The Oxygen Requirements of the Activated Sludge Process, Sewage Works Journal, April 1930, vol. 2, pp. 228–244.

Okun, D. A., et al.: Preliminary Investigations into the Effect of Oxygen Tension on Biological Sewage Treatmen, Biological Treatment of Sewage and Industrial Wastes, vol. I, Reinhold, New York, p. 207 (1956).

Pfeffer, J. T., et al.: Oxygen-Enriched Air for Biological Waste Treatment, Water and Sewage Works, vol. 112, October 1965, pp. 381–384.

MICHAEL ROGERS, Primary Examiner

U.S. Cl. X.R.

210—15, 104, 120, 197, 220, 242; 261—26, 93, 125

UNITED STATES PATENT OFFICE
CERTIFICATE OF CORRECTION

Patent No. 3,547,811         Dated December 15, 1970

Inventor(s) John R. McWhirter

It is certified that error appears in the above-identified patent and that said Letters Patent are hereby corrected as shown below:

Column 2, line 14, after "eration" insert a period. Column 3, line 67, "suply" should read -- supply --. Column 6 line 24, "oxygne" should read -- oxygen --. Column 7, line 15 "ovygen" should read -- oxygen --. Column 12, line 67, claim after "first", second occurrence, insert -- oxygenated liquid solid and first unconsumed oxygen- --.

Signed and sealed this 1st day of June 1971.

(SEAL)
Attest:

EDWARD M. FLETCHER, JR.         WILLIAM E. SCHUYLER, J
Attesting Officer         Commissioner of Patent